US006128958A

United States Patent [19]

Cain

[11] Patent Number: 6,128,958

[45] Date of Patent: Oct. 10, 2000

[54] PHASED ARRAY SYSTEM ARCHITECTURE

[75] Inventor: Charles A. Cain, Ann Arbor, Mich.

[73] Assignee: The Regents of the University of Michigan, Ann Arbor, Mich.

[21] Appl. No.: 08/927,599

[22] Filed: Sep. 11, 1997

[51] Int. Cl.[7] .......................... G01N 29/24; G01N 29/26

[52] U.S. Cl. .......................... 73/626; 600/447; 367/138

[58] Field of Search .......................... 73/625, 626, 628, 73/641, 633, 596, 632, 643, 602; 367/135, 136, 138, 178; 702/56, 103; 600/437, 443, 444, 447

[56] References Cited

U.S. PATENT DOCUMENTS

| | | | |
|---|---|---|---|
| 4,117,446 | 9/1978 | Alais . | |
| 4,351,038 | 9/1982 | Alais . | |
| 4,549,533 | 10/1985 | Cain et al. . | |
| 4,550,606 | 11/1985 | Drost . | |
| 4,622,972 | 11/1986 | Giebeler, Jr. . | |
| 4,757,820 | 7/1988 | Itoh . | |
| 4,791,915 | 12/1988 | Barsotti et al. . | |
| 4,829,491 | 5/1989 | Saugeon et al. | 367/103 |
| 4,888,746 | 12/1989 | Wurster et al. . | |
| 4,890,267 | 12/1989 | Rudolph . | |
| 4,938,217 | 7/1990 | Lele . | |
| 5,091,893 | 2/1992 | Smith et al. . | |
| 5,092,336 | 3/1992 | Fink . | |
| 5,097,709 | 3/1992 | Masuzawa et al. . | |
| 5,158,071 | 10/1992 | Umemura et al. . | |
| 5,295,484 | 3/1994 | Marcus et al. . | |
| 5,316,000 | 5/1994 | Chapelon et al. . | |
| 5,501,655 | 3/1996 | Rolt et al. . | |
| 5,563,346 | 10/1996 | Bartelt et al. | 73/626 |
| 5,566,675 | 10/1996 | Li et al. . | |
| 5,617,862 | 4/1997 | Cole et al. | 128/661.01 |
| 5,769,790 | 6/1998 | Waltkins et al. . | |
| 5,797,848 | 8/1998 | Vesely et al. . | |
| 5,932,807 | 8/1999 | Mallart | 73/641 |

FOREIGN PATENT DOCUMENTS

| | | |
|---|---|---|
| 0 017 382 | 10/1980 | European Pat. Off. . |
| 0 320 303 | 6/1989 | European Pat. Off. . |
| 2 099 582 | 12/1982 | United Kingdom . |

*Primary Examiner*—Hezron Williams
*Assistant Examiner*—Rose M. Miller
*Attorney, Agent, or Firm*—Harness, Dickey & Pierce, P.L.C.

[57] ABSTRACT

Architecture for driving a ultrasound phased array. The architecture includes a series of amplifiers which produce discrete driving signals. The amplifiers number less than the number of transducer elements in the array and an integrated circuit multiplexer chip is coupled to each transducer and to all the amplifiers. A controller provides first control signals to the amplifiers causing the amplifiers to produce their discrete driving signals. The controller further provides second control signals to each multiplexer chip and these signals cause the multiplexer chips to pass a specified one of the driving signals to a selected one of the transducer elements. The result is that a focused ultrasonic beam is formed on a selected target volume.

32 Claims, 4 Drawing Sheets

PHASED ARRAY SYSTEM ARCHITECTURE

STATEMENT OF GOVERNMENTAL SUPPORT

This invention was made possible in part by a grant from the National Institute of Health (NIH), grant number CA44124.

BACKGROUND

1. Field of the Invention

The present invention generally relates to ultrasound phased arrays. More specifically, the invention relates to the architecture of the electronic system used to drive the array of the phased array system. While ultrasound phased arrays are applicable to therapeutic applications, including non-invasive surgery, laproscopic surgery, non-invasive cardiac ablation, drug delivery, drug activation and hyperthermia cancer therapy, it will be readily appreciated by persons skilled in ultrasound phased array technology that alternative and additional applications are well within the purview of this invention.

2. Description of the Prior Art

The construction and operation of ultrasound phased arrays is generally well known. Their construction typically includes a series of transducer elements supported on a curved or flat substrate. In order to drive the transducer elements, prior systems have included an individual drive amplifier for each transducer element. This approach is reasonable for a relatively small array, one without too many elements, such as a 32 element array. Large aperture ultrasonic arrays of today, however, have a much greater number of transducer elements, often requiring over a thousand elements. While the increased element count can result in greater flexibility in terms of forming a high quality, focused beam, it also can and does result in other drawbacks and limitations.

One major drawback associated with these large aperture arrays is the cost. The cost of the prior systems is directly related to the number of channels used in the system since each channel requires its own drive amplifier, drive cable, matching circuit, in addition to a transducer element and other components. Obviously, with an increased number of elements there is an increased number of amplifiers, etc. and a corresponding increase in, not only the cost, but also the size of the array and the system itself. As the size of the system increases, portability becomes compromised. The many cords, cables, coax and other transmission lines result in large bundles and a significant number of expensive specialized connectors. Since the bundles are mechanically stiff, the array itself (that part of the system which must be close to the patient) is difficult to move and to adjust for individual applications. This is particularly difficult for laproscopic arrays meant to operate inside the body and which are inserted via a small incision.

While array sizes have gotten larger, the size of the transducer elements has gotten smaller. With this reduction in element size there has also been a corresponding increase in the impedance of the systems. This has in turn required larger and more inefficient matching circuits, further increasing in size and cost while decreasing efficiency.

The high channel count (one amplifier and element per channel) of prior ultrasound phased array systems has often required that an economic tradeoff be made in the amplifier design. To reduce costs per channel, the amplifiers can be packaged on a circuit board, for example, sixteen (16) amplifiers per circuit board. In a large element array, for example, one having 1024 elements and an equal number of coax cables, the total number of amplifier circuit boards and matching network circuit boards would be the number of elements divided by the number of amplifiers per circuit board. For the above illustrative examples, the number of amplifier circuit boards and matching network circuit boards would be 64 each.

In the known system, each amplifier generates a “square wave” drive signal and, as a whole, the drive signals are only partially filtered by the matching networks. This results in harmonic rich signals on the drive cables. While it is possible to provide the amplifier circuit boards and the matching network circuit boards with coax and shielded RF boxes, this further adds to the overall bulk and expense of the system. Without the shielding, however, radiation from the RF energy is likely to be present in an amount that is unacceptable to the FCC and the actual end use environment, such as a hospital.

In view of the foregoing limitations and shortcomings of the prior art devices, as well as other disadvantages not specifically mentioned above, it should be apparent that there exists a need for an improved, large aperture ultrasound phased array system.

It is therefore a primary object of this invention to fulfill that need by providing an ultrasound phased array system having an improved architecture for driving the array.

Another object of this invention is to reduce the overall component count of the phased array without reducing the number of transducer elements. This includes reducing the number of drive amplifiers, cables, and associated hardware required to drive the elements. One feature of the present invention is that multiple transducer elements are driven by a common amplifier, thereby reducing the number of drive channels required for the array.

This invention also has as one of its objects providing an ultrasound phased array with reduced bulk and cost.

Still another object of this invention is to provide a drive system which allows signals to be passed both to and from the transducer elements thereby allowing the transducer elements to also be used as receivers.

Still another object of this invention is to provide a drive architecture which allows each amplifier to see an enlarged “effective” transducer element size having a lower impedance and which is therefore easier to electrically match.

SUMMARY OF THE INVENTION

Briefly described, these and other objects are accomplished according to the present invention by providing an apparatus or system which generates, forms and directs an ultrasound beam at a target to selectively heat portions of the target. The apparatus includes an ultrasound source having multiple transducer elements which form the array. The present invention significantly changes the architecture of the electronics used to drive large aperture, and ultrasound phased array systems. Generally this is achieved by capitalizing on the fact that with prior large aperture arrays, numerous transducer elements are inevitably driven at the same phase and at the same time, but by different amplifiers.

With the present invention, the number of distinct driving phases, the critical parameter needed for precise beam forming, is first specified. Having specified the number of separate or distinct driving phases or signals (for example 32), when providing these driving signals to the array, the total channel count or number of amplifiers can be reduced from one amplifier per transducer element to one amplifier per distinct driving phase. This is achieved by providing appropriate electronics (for switching) within the array housing so as to selectively connect each element to a driving signal of the proper phase and at the proper time.

The present configuration therefore requires a small and relatively inexpensive switching apparatus for selectively connecting distinct driving signals to the proper elements at the proper time. The switching apparatus must also be able to fit within the array housing to ensure a compact construction.

The above is accomplished through the use of high voltage multiplexer integrated circuit (MUX) chips. The MUX chips couple the transducer elements to the drive signals and thus, the number of MUX chips which are required with the present invention relates to the number of elements. Since the MUX chips are integrated circuit chips having a low overall per unit cost in comparison to amplifiers, the result is a significant savings in overall cost of the system. Further, the MUX chips are cheaper and smaller than the discrete amplifiers required by a previous design. By having only a minimum specified number of amplifiers and a corresponding number of coax cables extending between the drive and control system, the array itself is more portable and less "tethered" to the control circuitry than previously seen.

A controller is coupled to both the MUX chips and the driver amplifiers. Each amplifier receives from the controller a control signal that activates the drive amplifier to produce its driving signal. A second set of control signals are provided to the MUX chips and these control signals cause the MUX chips to pass a specific driving signal to its corresponding transducer element. Each MUX chip, accordingly, provides a discrete driving signal to its associated transducer element. Through the use of the MUX chips, each driving amplifier is used to drive more than one transducer element. In the present invention, the number of drive amplifiers is made to correspond to the number of discrete phases required to drive the system. This number is less than the number of transducer elements in the array. For example, if the array has 1024 elements and the phase of each element is specified by a n-bit binary code, the number of required drive amplifiers is reduced from one for every transducer element (e.g. 1024) is a number equal to $2^n$. If the possible drive phases are to be specified by a 5-bit binary code, the required number of drive phases, and amplifiers, is $2^5$ or 32. Accompanying this reduction in the number of drive amplifiers and overall cost of the system is a significant reduction in the physical size of the electronics for the system. This size reduction is the result of the correspondingly reduced number of matching circuits and coaxial cables required to connect the drive amplifiers to the transducer elements.

By reducing the number of drive amplifiers and the associated cost, the present invention allows economic resources to be devoted to the quality of the amplifiers. In this way, amplifiers with highly filtered outputs, reduced harmonics and more elaborate circuit protection may be employed. The additional problem of specifically matching amplifiers to individual transducer elements is reduced by the present invention because the "effective size" of the transducer element seen by each amplifier is increased by a factor of $2^n$. Overall energy requirements are reduced because the increased effective size of the transducer elements allows for greater driving efficiency.

Since the MUX chips can be surface mounted on circuit board material located within the array housing itself, the wire count from the driving and control system to the array is reduced from one per element to one per amplifier. Also reduced are the accessory and parts count (discrete electronic components, circuit loads, connectors, housing boxes, etc.), again, by the same numbers. Finally, digital control problems associated with parallel loading of data into a large memory device (FIFO chips or high speed static RAM memory) are greatly reduced to a single serial data bus (or slightly larger parallel data bus) connected in common to all the MUX chips.

Another advantage of the present invention is that it allows for electronic signals to be passed in both directions. Some of the transducer elements in the array can therefore be used as receiving transducers while other elements in the array are used as driving transducers. For example, if a transmitting or beacon transducer is inserted into a target tissue volume via a catheter or insertion needle, the ultrasound beam produced by the phased array can be made to rapidly refocus and track a moving target tissue volume through the use of the receiving transducer elements to measure the phase between each transducer element (or a subset of transducer elements) and the beacon transducer.

In an alternative embodiment of the present invention, a set of multiplexers per element are provided on a circuit board or substrate near the element or in a housing closely integrated with the array assembly. Each set of multiplexers is integrated as an individual chip or multiple (k) sets are integrated on one chip (MUX chip) such that each integrated chip drives k elements, where k is an integer. As with the prior embodiment, only a specified number of distinct driving signals are utilized with the present embodiment. Electronics within the housing of the array connect an amplified driving signal (of the proper phase) to the appropriate transducer element. Again, the total channel count is reduced from the number of elements to the number of required discrete driving phases. Having the same number of signal lines as the number of discrete driving phases, the present embodiment does not require high power or high RF voltage coax cables between the driving control system and the remotely located array. This again makes the array less tethered to the control circuitry.

With this embodiment, the drive signals (which can be generated either within the array housing itself or conveyed to the housing by small inexpensive digital cables) are locally amplified before being provided to the appropriate elements. Amplification is accomplished with high voltage multiplexer integrated circuits (MUX chips) which alternately switch the elements between a high voltage source line and ground. This is achieved by making one of the lines to the MUX chips the high voltage source line. Accordingly, the present embodiment requires two MUX chips or switches per element.

This latter embodiment is also advantageous in that it allows all or a subset of the transducer elements to be connected to receiver amplifiers in order to simultaneously measure all or a subset of the phases being transmitted from a beacon transducer within the target tissue volume as discussed above. By making parallel measurements, the time to measure a new set of drive phases for the elements is reduced by a factor corresponding to the number of elements being used as receivers. When this number is large, the time savings is significant.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

Figure 1:
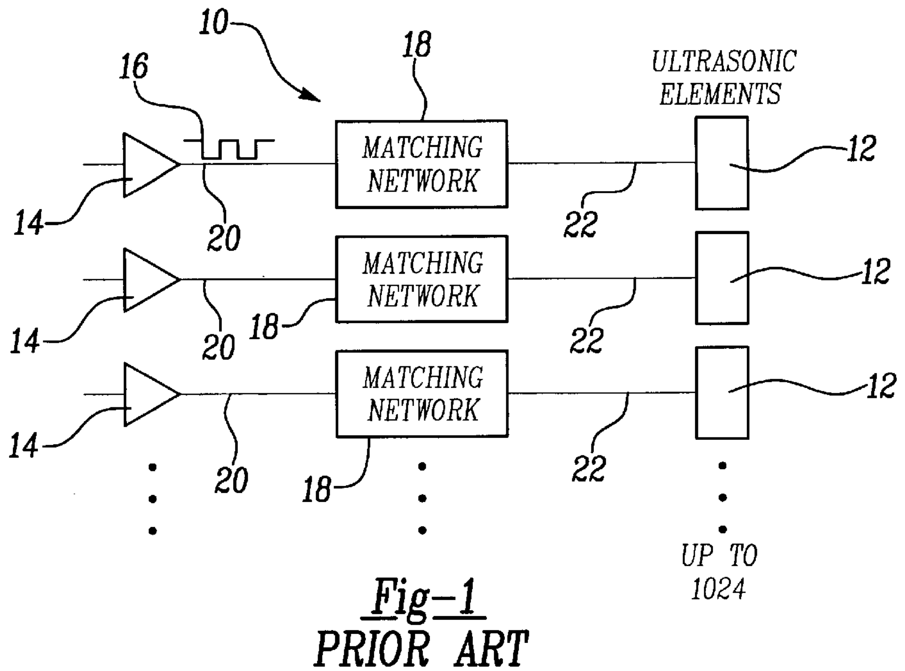
Fig–1 PRIOR ART
FIG. 1 is a schematic illustration of an ultrasound phased array system according to the prior art where each transducer element is driven by its own designated amplifier and matching network.

Referring now to FIG. 1, illustrated schematically therein is an ultrasound phased array system 10 according to a prior design. Prior system 10 included a number of ultrasonic transducer elements 12, up to a thousand or more, and a corresponding number of drive amplifiers 14. Each drive amplifier is coupled to one specific transducer element 12. The amplifiers 14 produce square wave drive signals 16 that drive the transducer elements 12. Each amplifier 14 also includes its own matching network 18 which partially filters the drive signal 16 received from the amplifier 14 on the drive line 20 and provides the drive signal to the transducer element 12 on line 22. As readily seen by this figure, the number of amplifiers 16 and matching networks 18 directly corresponds to the number of transducer elements 12. For a large aperture array, which may have over a thousand transducer elements 12, it is easily seen that the overall cost, size and portability of the system 10 is compromised as the array size increases.

Figure 2:
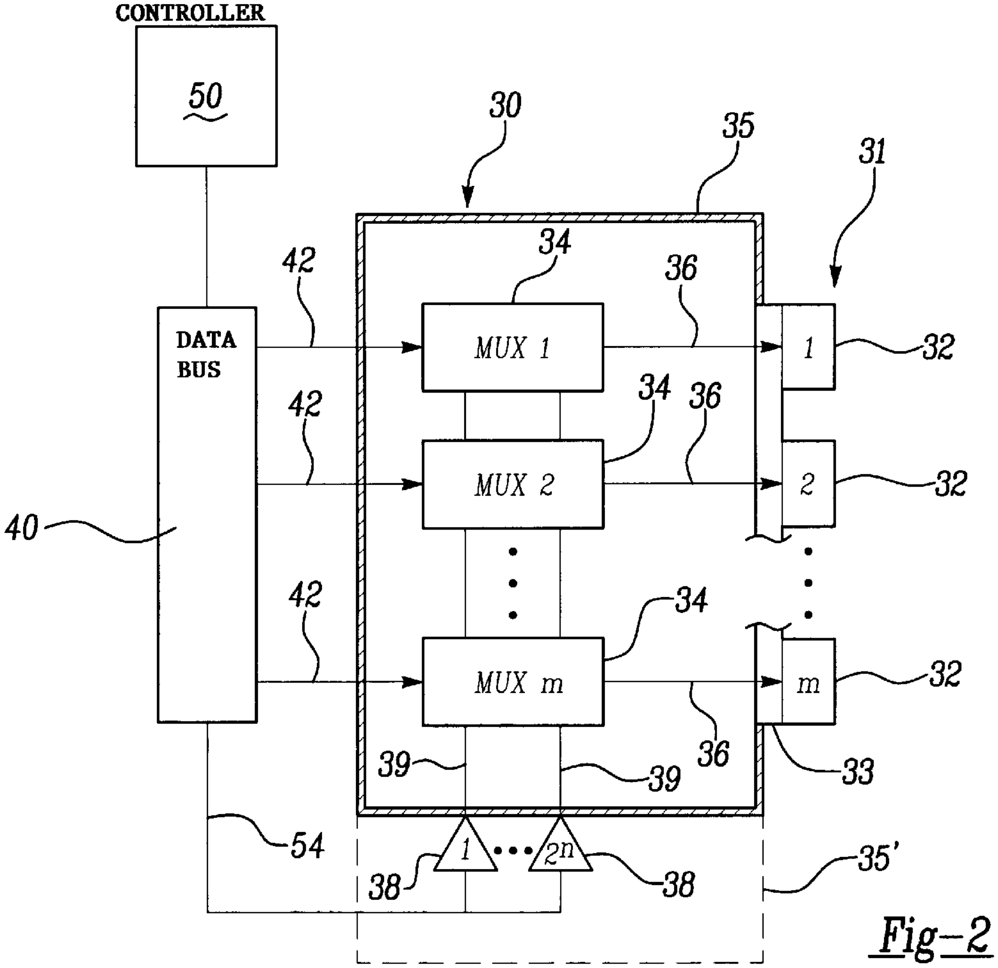
FIG. 2 is a schematic illustration of the ultrasound phased array system of the present invention with its reduced number of amplifiers.

An overall system configuration for an ultrasound phased array system 30 according to one embodiment of the present invention is shown in FIG. 2. In the present system 30, the phase of any particular transducer element 32 is determined by an n-bit binary code resulting in only $2^n$ possible phases at which the transducer element 32 can be driven. The array 31 itself is made up of a number of transducer elements 32 which are greater than the number of possible phases. The present invention includes means for specifying and implementing the proper connection between each transducer element 32 and the smaller number of driving signals. This is achieved by the incorporation of integrated multiplexer circuit (MUX) chips 34 into the system 30 design. More specifically, one MUX chip 34 is coupled to each transducer element 32 by line 36 and each MUX chip 34 is coupled to all of the amplifiers 38 by lines 39. A serial or parallel digital data bus 40 connects a controller 50, by lines 42, to each MUX chip 34. Data provided by the controller 50 to the MUX chips 34 includes an n-bit binary code which specifies the drive line 39 or amplifier 38 to which each transducer element 32 is to be connected.

Figure 3:
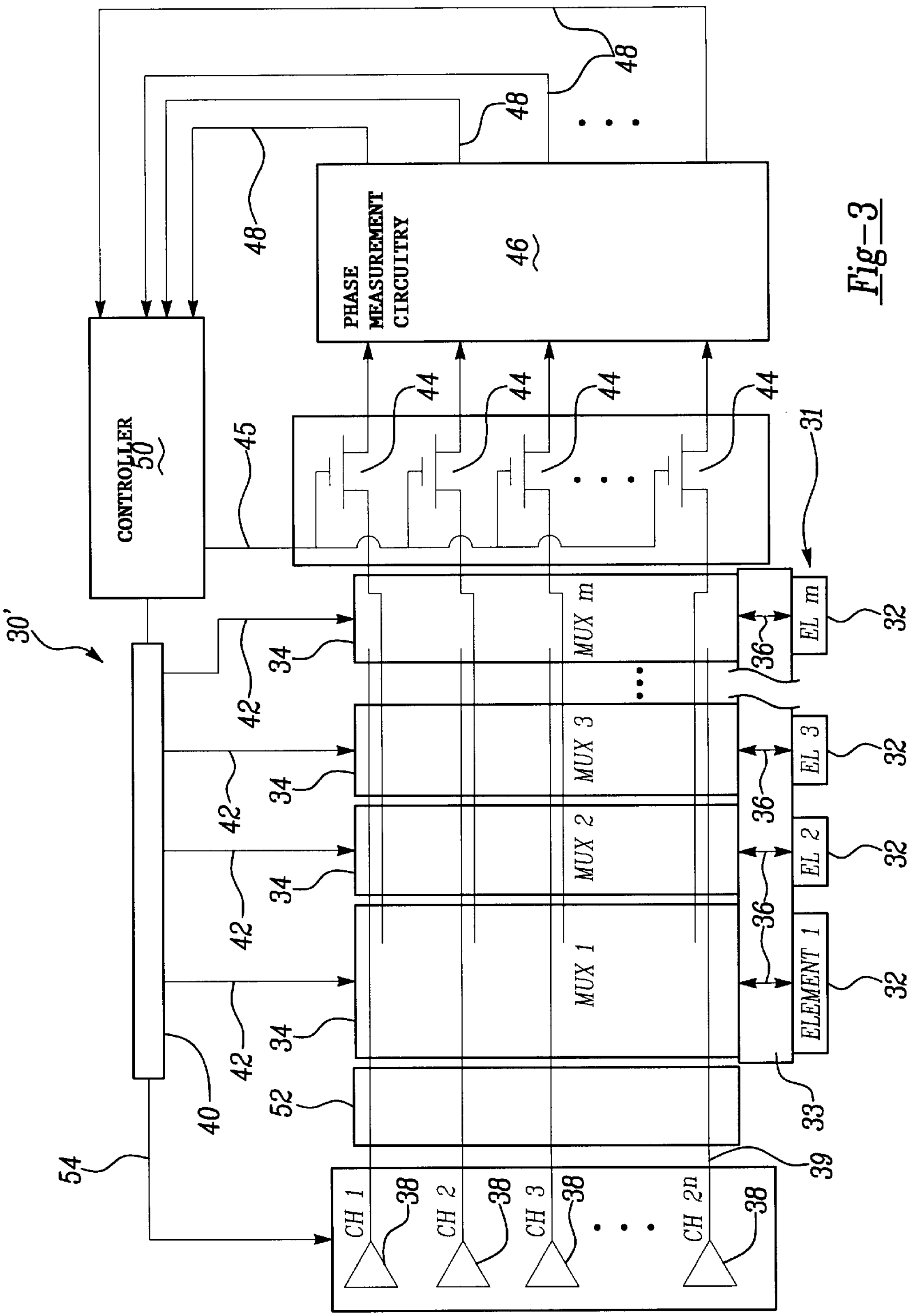
FIG. 3 is a schematic diagram similar to FIG. 2, of a second embodiment of the present ultrasound phased array system.

An alternative embodiment of an ultrasound phased array system 30' according to the present invention is schematically illustrated in FIG. 3. Since the embodiment of FIG. 3 has numerous components in common with the embodiment of FIG. 2, like components are being designated with like item numbers. This second embodiment differs from the first embodiment in that the second embodiment is equipped to utilize at least some of the transducer elements 32 as receivers, thereby allowing for the measuring of "phase delays" between the transmitting transducer elements 32 and a treatment volume into which the acoustic beam is being formed or focused.

In such a situation, a beacon transducer (not shown), positioned within the treatment volume by a catheter, needle or other appropriate mechanism, transmits a sinusoidal signal (CW or tone burst). This signal is received in parallel by all the transducer elements 32 which are specified by the data bus 40 as being receiver elements 32. By measuring phases in parallel until all the phase delays have been obtained, the time required for beam reforming is reduced by a factor corresponding to the number of phases being measured. Such a reduction in beam reforming time is extremely important where beam reformation is used to allow the beam to track and follow a moving target, such as a target cardiac tissue volume during cardiac ablation.

By simply changing, via the MUX chip 34, the drive line 39 to which a particular transducer element 32 is connected, adaptive beam forming is effectuated. The small digital control lines 42 to the MUX chips 34 are easily shielded from system operating electrical noise and no loading or operating of specialized memory chips is required. Only the controller's generation of the appropriate digital code, to specify which MUX chip 34 connects its transducer element 32 to which drive line 39, is required. Transistor switches 44 (FET switches) are used to protect phase measurement circuitry 46 from the higher voltage output of the drive amplifiers 38. Line 45 couples the controller 50 to the transistor switches 44 and is utilized as an "on/off" control line. Similar transistor switches can be used to remove the output of the drive amplifiers 38 from the lines 36 being used as receiver lines for the various transducer elements 32 being used as receivers. In this way, the system 30' is provided with maximum sensitivity. Phase data from the receiver transducer elements 32 and the phase measurement circuitry 46 is transferred via lines 48 to the controller 50. Based on the phase data, the controller 50 recalculates the focus of the beam to maintain the beam specifically on the target tissue volume.

The controller 50 is PC based or may be any other well known type of controller. During operation of the system 30', the controller 50 specifies over the data bus 40 which specific transducer element, and therefore which specific MUX chip 34, are to receive the drive signal from a specific amplifier 38. The driving signals themselves (which may be sinusoidal, square wave or other) are provided to the MUX chips 34 by a drive line bus 52. In addition to providing control signals to the MUX chips 34 for beam forming, the controller 50 also provides the appropriate signals to the MUX chips 34 whose transducer elements 32 are to be used as receiver elements and provides appropriate control signals via line 54 to the drive amplifiers 38 specifically their operational phase.

In both of the above embodiments, the drive amplifiers 38 are preferably of a low output impedance design (voltage sources) where the drive voltage remains constant as the impedance changes. Impedance changes will occur as a result of changing connections by the MUX chips 34 to different sets of transducer elements 32 as the acoustic beam is refocused during a procedure. Alternatively, since each amplifier 38 will see on average $m/2^n$ elements, the design of the amplifiers 38 can be such that their output impedance is matched to the expected local impedance. This reduces reflection and possible standing wave problems if the drive lines 39 are long.

In previous systems, the drive amplitude could be controlled on a per amplifier/transducer basis providing good flexibility for amplitude and phase control. In the present systems 30 and 30', the amplitudes are all the same unless special design features are incorporated into the systems 30 and 30'. However, past experience has shown that phased arrays are typically used in either a full "on" or a full "off" amplitude control mode. To implement this mode in the present systems 30 and 30', one of the drive lines 39 is sacrificed as an "on/off" line and therefore carries no drive signal. This leaves $2^n-1$ discrete phases for beam forming. When a transducer element 32 is to be operated in a turned "off" mode, the transducer element 32 is connected to the sacrificed drive line 39. While a compromise on beam formation, this operation results in only a very minor loss of phase control. Alternatively, half of the drive lines 39 can be sacrificed providing a set of "half power" amplifiers 38 and giving additional amplitude control. Prior experience, however, indicates that with increased element arrays, full "on"/off" control will be sufficient.

Figure 4:
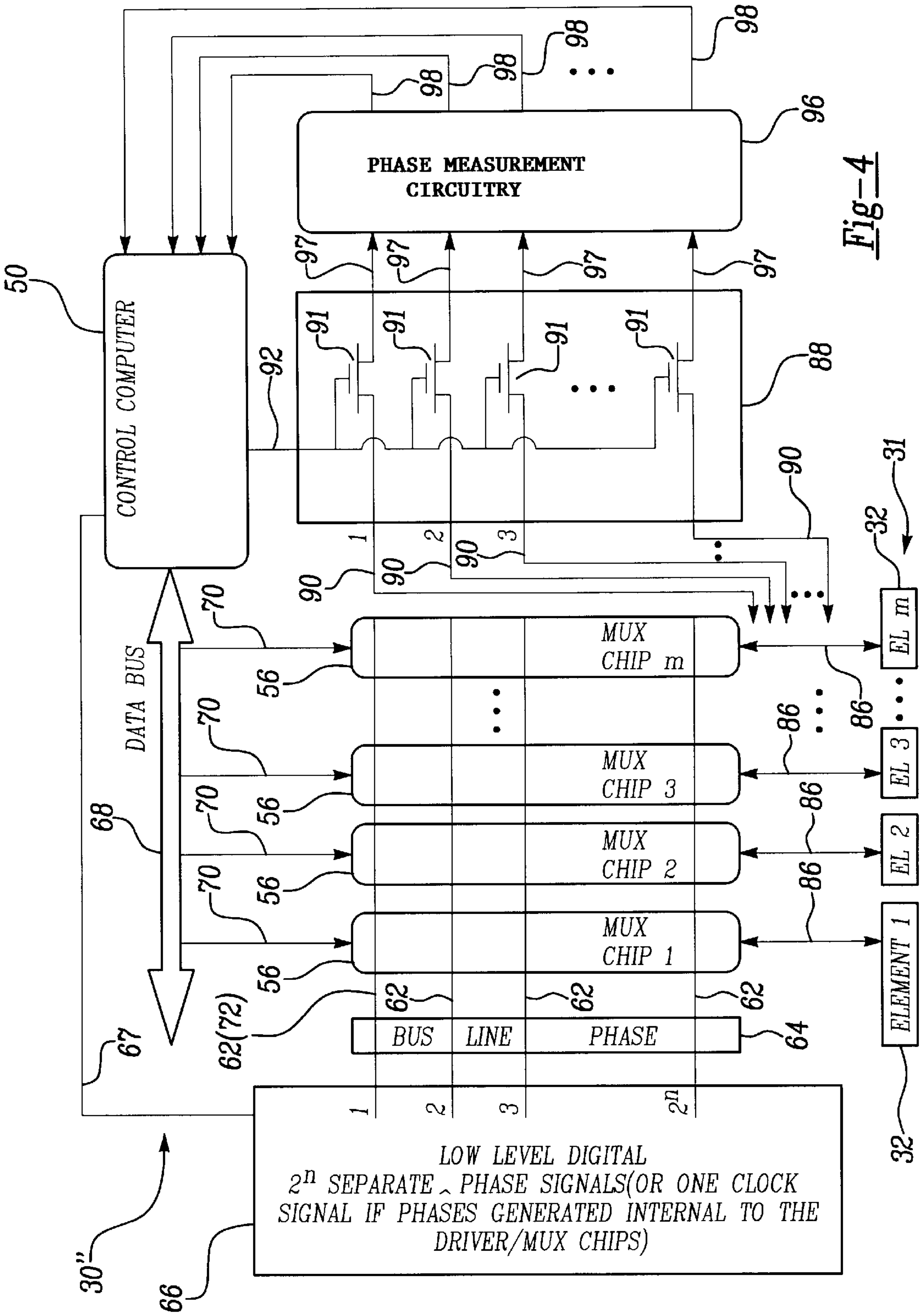
FIG. 4 is a schematic illustration of an ultrasound phased array system according to another embodiment of the present invention.

A third embodiment of a phased array system 30" according to the present invention is schematically illustrated in FIG. 4. As with the previous embodiments, the phase at which any particular transducer element 32 is driven is determined by a n-bit binary code and this results in possible phases, which in this embodiment are provided as low level digital phase signals. By specifying and implementing the proper connection between each transducer element 32 and the discrete, low level digital phase signals, the array 31 formed by the elements 32 is caused to produce a focused ultrasonic beam.

Figure 5:
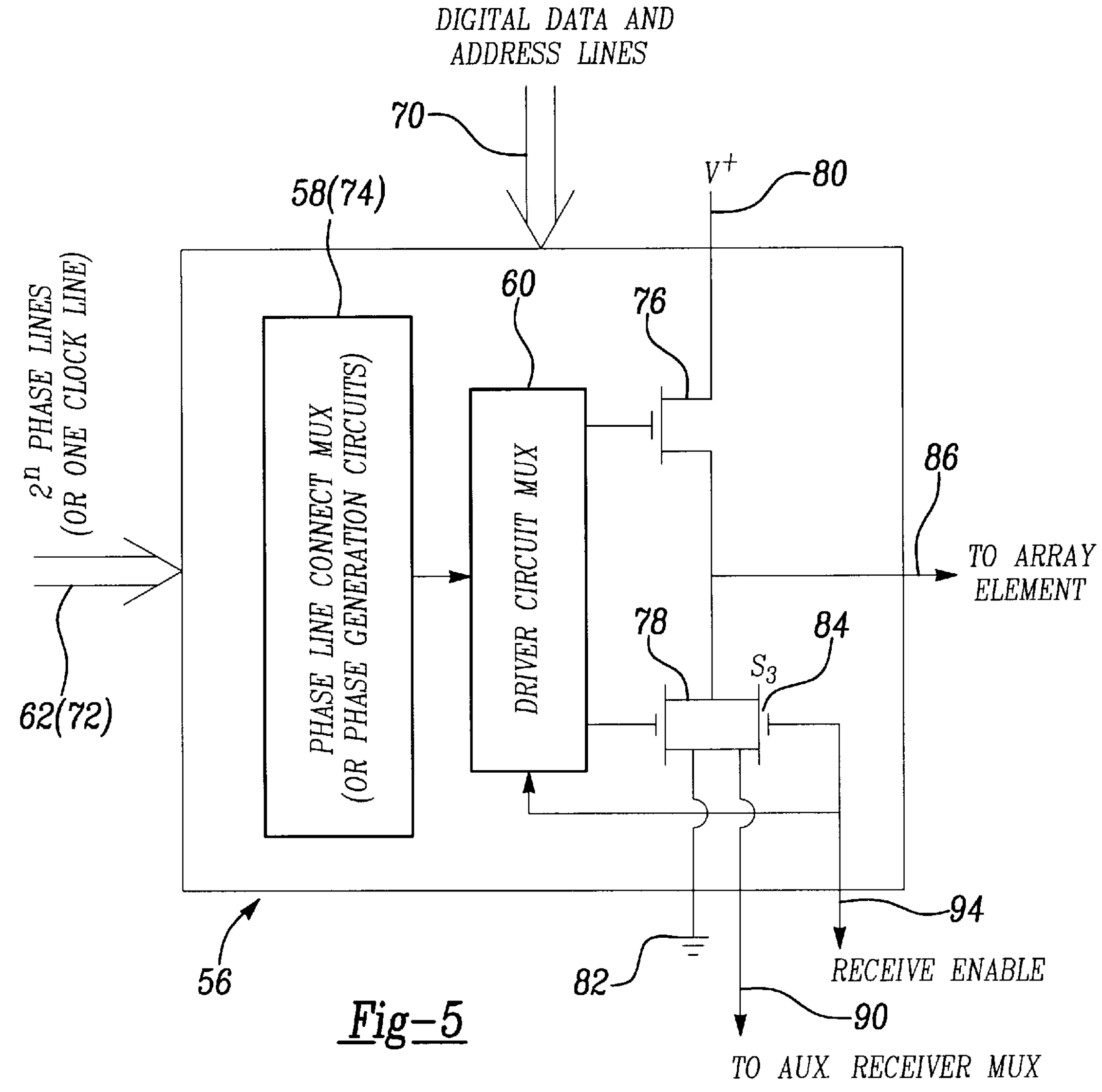
FIG. 5 is a schematic illustration of one implementation of an MUX chip as utilized in the embodiment of FIG. 4.

More specifically, this is accomplished by utilizing integrated circuit multiplexers (MUX chips) 56 to achieve the connection. The MUX chips 56 each include two multiplexers thereon. As seen in FIG. 5, one is the phase line connect multiplexer 58 (or phase generation circuit) and the other is the driver circuit multiplexer 60.

The phase line connect multiplexer 58 of each MUX chip 56 is connected with the $2^n$ phase lines 62 which are in turn coupled through the phase line bus 64 to the low level digital phase signal generator 66. The phase signal generator 66 itself is controlled by the controller 50 or other approximate means by way of line 67. Switching within each MUX chip 56 between the phase signals provided over the phase lines 62 is controlled by the switch driver circuit multiplexer 60.

The phase line connect multiplexers 58 and the switch driver circuit multiplexers 60 receive their signals from the controller 50 through a data bus 68 (which may be either a serial data bus or a parallel data bus) and over lines 70. The data provided from the data bus 68 includes the n-bit binary code which specifies the phase line 62 to which the phase line connect multiplexer 58 will connect. The data also includes a k-bit binary code which specifies the element 32 to which the switch driver circuit multiplexer 60 will connect. For example, where there are 1024 (m=1024) elements 32 and only thirty-two (32) discrete phases, a 5-bit binary code (n=5 and $2^n$=32) specifies the phase line 62 and a 10-bit binary code (k=10 and $2^k$=1024) specifies the particular element 32 to which the phase line 62 is to be connected.

In a variation of this third embodiment, the phase signal is generated internally of the MUX chips 56. In this variation, instead of $2^n$ phase lines connected to each MUX chip 56, one clock line (alternately designated as 72) enters each MUX chip 56. The n-bit binary code would then designate which phase is to be generated by a phase generation circuit (alternately designated at 74 in FIG. 5). Advantages of generating the phase signals on the MUX chips 56 include a reduction in the number of signal lines from the controller 50 and an ability to specify the amplitude of each channel separately. The latter advantage would be accomplished via a digital code at the controller 50 which would specify the duty cycle of the phase signal and therefore the amplitude of the phase signal to the element 32.

Two additional switches 76 and 78 are provided on the MUX chips 56 and connected to the switch driver circuit multiplexer 60. One of these switches 78 is connected to a high voltage supply 80 and the other to ground 82. The switch 78 connected to ground 82 is further connected in parallel with a receiver switch 84 also on the MUX chip 56. By alternately opening and closing the switches 76 and 78 in a complementary manner (and at a specified frequency, phase and duty cycle) while the receiver switch 84 is held open by a receive enable line 94 (coupled to the controller 50, an amplified phase signal is provided to the appropriate transducer element 32 over line 86 causing the transducer element 32 to alternately charge and discharge.

For beam reforming and target volume tracking, an external, auxiliary receiver multiplexer 88 is connected to the output lines 90 of the receiver switches 84 while also being connected to the controller 50 by way of a receive on/off control line 92. The output lines 90 of the receiver switches 84 are more specifically connected to transistor (FET) switches 91 of the auxiliary receiver multiplexer 88, which in turn terminate via lines 97 at phase measurement circuitry 96 of a well known construction. The on/off control line 92 from the controller 50 is used to open and close the transistor switches 91 permitting, in conjunction with the receive enable line 94, a number or subset of the elements 32 to operate as receiver elements.

To measure phase delays between each element 32 and the treatment volume within which the beam is being formed or focused, a transmitter transducer (not shown) is positioned by a catheter, needle or other means in the treatment volume and the transmitter transducer is caused to transmit a sinusoidal (CW or tone burst) signal. The controller 50 activates an appropriate number of elements 32 to operate as receivers by closing the appropriate receiver switches 84 via the receiver enable lines 94 and closing the corresponding FET switches 91 via the on/off control line 92. By utilizing the receiver switches 84, one of several elements 32 is connected to an output line 90 allowing a number of output lines 90 to monitor a subset of the elements 32 as receivers. For example, if there are 1024 (n=1024–$2^{10}$) elements 32 and we monitor thirty-two (32) lines or elements at a time, then we would have $2^{10}/2^5=2^5=32=2^r$ subsets of elements to measure. It is then possible to specify which subset is to be monitored with an r=5-bit binary code. All $2^r$=32 receiver switches 84 would then be turned "on" to connect that particular subset to the output lines 90. This would therefore leave 31 other subsets of elements 32 which could alternatively be specified by the $2^r$ code.

Once receiving the signals from the subset of elements 32 operating as receivers, the phase measurement circuitry 96 provides the phase measurements to the controller 50. With the output lines 90 and lines 97 providing the received phase signals in parallel to the phase measurement circuitry 96, the measurement process and refocusing or reformation of the beam is reduced by a factor of q (the number of elements 32 operating as receivers). This is essential if a rapidly moving target is to be tracked, such as during cardiac ablation.

When not operating in the receiving mode, the FET and receiver switches 91, 84 serve another purpose. By remaining open during beam formation, the FET and receiver switches 91, 84 protect the phase measurement circuitry 96 from the higher voltage output to the elements 32.

Each MUX chip 34, 56 is preferably surface mounted on an interconnect board consisting of a set of multi-layer circuit boards or multi-layer flex boards located very close to the transducer elements 32. This design is advantageous in that it saves space and eliminates long unshielded lines 36 from the MUX chips 34, 56 to the transducer elements 32. For example, the MUX chips 34, 56 can be surface mounted on flex board (not shown) directly above the back surface of the array 31 within the housing 35 of the array structure. This is illustrated in FIG. 2. Alternatively, the MUX chips 34, 56 can be mounted directly on the back surface of an array 31 where circuit board-like interconnectors are formed on the back surface of the polymer matrix which forms the substrate 33 or bulk of the composite array 31. This is illustrated in FIG. 3.

Since a reduced number of amplifiers 38 are required with the present invention, it is possible to also house the amplifiers 38 within the housing 35' of the array structure, as seen in phantom in FIG. 2. This allows for the elimination of all high powered interconnect lines between the drive and control aspects of the system 30 and the array. Only digital control lines and power supply lines would be required.

With all of the embodiments of the present invention, digital control problems of prior systems (resulting from the loading of large amounts of digital data into FIFO or static RAM memory devices which continuously operate in the very noisy environment caused by the large number of inexpensive amplifiers all operating simultaneously) are eliminated. With the present invention the memory devices are currently used to form the separate digital signals and each signal is formed with the proper phase to drive a particular channel (amplifier, matching circuit, connect cable and only one of the elements).

It is to be understood that the invention is not limited to the exact construction illustrated and described above, but that various changes and modifications may be made without departing from the spirit and scope of the invention as defined in the following claims.

I claim:

1. A system for driving an ultrasound phased array having a plurality of transducer elements and producing a focused acoustic beam, said system comprising:

drive signal means for providing a plurality of driving signals, said driving signals being less in number than the transducer elements and the number of said driving signals corresponding to a number of discrete phases provided by said drive signal means;

switching means connected to the transducer elements, said switching means also being connected to receive said driving signals, said switching means for selectively connecting said driving signals to the transducer elements and at least one said driving signals being applied simultaneously to a plurality of the transducer elements;

control means for providing first control signals to said drive signal means and for providing second control signals to said switching means, said first control signals causing said drive signal means to produce said driving signals, said second control signals causing said switching means to pass a specified driving signal to a selected transducer element; and whereby the transducer elements cooperate to produce a focused ultrasonic beam as a result of receiving said driving signals.

2. A system as set forth in claim 1 wherein one switching means is provided for every transducer element.

3. A system as set forth in claim 1 wherein said switching means are integrated multiplexer circuits.

4. A system as set forth in claim 1 wherein each of said driving signals is provided to all of said switching means.

5. A system as set forth in claim 1 further comprising phase measurement means for operating the transducer elements as receiving transducers to track a target and refocusing the beam on the target during movement thereof, said phase measurement means being connected to said control means and to said transducer elements.

6. The system as set forth in claim 5, wherein said phase measurement means is coupled to the transducer elements through said switching means.

7. The system as set forth in claim 6 wherein the transducer elements being utilized as receiving transducers are coupled in parallel to said phase measurement means.

8. The system as set forth in claim 1 wherein said driving signals are low level digital phase signals and said switching means includes amplifier means for amplifying said phase signals provided to the transducer elements.

9. The system as set forth in claim 1 wherein said drive signal means and said switching mean are together provided on an integrated circuit multiplexer chip and one multiplexer chip is provided for each of the transducer elements.

10. The system as set forth in claim 9 wherein said drive signal means includes phase generation means for generating said driving signals.

11. A system for driving an ultrasound phased array having a plurality of transducer elements and producing a focused acoustic beam, said system comprising:

drive signal means for providing a plurality of driving signals, said driving signals being less in number than the transducer elements, said drive signal means including a plurality of amplifiers and each of said amplifiers producing a driving signal of a different phase;

switching means connected to the transducer elements, said switching means also being connected to receive said driving signals, said switching means for selectively connecting said driving signals to the transducer elements;

control means for providing first control signals to said drive signal means and for providing second control signals to said switching means, said first control signals causing said drive signal means to produce said driving signals, said second control signals causing said switching means to pass a specified driving signal to a selected transducer element; and whereby the transducer elements cooperate to produce a focused ultrasonic beam as a result of receiving said driving signals.

12. A system as set forth in claim 11 wherein said amplifiers correspond in number to the number of different driving signals required for beam formation.

13. A system for driving an ultrasound phased array having a plurality of transducer elements and producing a focused acoustic beam, said system comprising:

drive signal means for providing a plurality of driving signals, said driving signals being less in number than the transducer elements;

switching means connected to the transducer elements, said switching means also being connected to receive said driving signals, said switching means for selectively connecting said driving signals to the transducer elements and at least one said driving signals being applied simultaneously to a plurality of the transducer elements;

control means for providing first control signals to said drive signal means and for providing second control signals to said switching means, said first control signals causing said drive signal means to produce said driving signals, said second control signals causing said switching means to pass a specified driving signal to a selected transducer element;

whereby the transducer elements cooperate to produce a focused ultrasonic beam as a result of receiving said driving signals;

phase measurement means for operating the transducer elements as receiving transducers to track a target and refocusing the beam on the target during movement thereof, said phase measurement means being connected to said control means and to said transducer elements, said phase measurement means is coupled to the transducer elements through said switching means; and protective means for isolating said phase measurement means from said driving signals, said protective means including switches located between said phase measurement means and said switching means, said switches being closed by said control means to utilize the transducer elements as receiving transducer.

14. A system for driving an ultrasound phased array having a plurality of transducer elements and producing a focused acoustic beam, said system comprising:

drive signal means for providing a plurality of driving signals, said driving signals being less in number than the transducer elements;

switching means connected to the transducer elements, said switching means also being connected to receive said driving signals, said switching means for selectively connecting said driving signals to the transducer elements and at least one said driving signals being applied simultaneously to a plurality of the transducer elements;

control means for providing first control signals to said drive signal means and for providing second control signals to said switching means, said first control signals causing said drive signal means to produce said driving signals, said second control signals causing said switching means to pass a specified driving signal to a selected transducer element;

whereby the transducer elements cooperate to produce a focused ultrasonic beam as a result of receiving said driving signals; and wherein said switching means includes a phase line connect multiplexer coupled to a switch driver circuit multiplexer, said phase line connect multiplexer being coupled to said control means and connecting to a specified driving signal in response to a control signal from said control means, said switch driver circuit multiplexer coupled to said control means and connecting to a specified transducer element in response to a control signal from said control means thereby driving the specified transducer element according to the specified driving signal.

15. The system as set forth in claim 14 wherein said driving signals are low level digital phase signals and said switching means includes amplifier means for amplifying said phase signals provided to the transducer elements.

16. The system as set forth in claim 15 wherein said amplifier means being coupled to said switch driver circuit means.

17. A system for generating and directing a focused ultrasound beam at a predetermined target, said system comprising:

an ultrasonic array, said array including a plurality of transducer elements supported relative to one another by a support structure;

a plurality of switching means for providing a driving signal to said transducer elements, said plurality of switching means corresponding in number to said transducer elements;

driving signal means for providing a plurality of driving signals, said driving signals being less in number than said transducer elements and said driving signal means being electrically connected to at least one of said switching means to provide said driving signals thereto and wherein at least one said driving signal is applied simultaneously to a plurality of the transducer elements and the number of said plurality of driving signals corresponds to a number of discrete phases provided by said drive signal means;

control means electrically connected to said driving signal means and to said switching means, said control means for providing first control signals to said driving signal means and causing said driving signal means to provide said driving signals, said control means also for providing second control signals to said switching means and causing said switching means to connect a selected one of said driving signals to a specified one of said transducer elements; and whereby said transducer elements cooperate so as to form an ultrasonic beam focused on a preselected target as a result of said transducer elements receiving said driving signals.

18. A system as set forth in claim 17 wherein one switching means is provided for every transducer element.

19. A system as set forth in claim 17 wherein said switching means are integrated multiplexer circuits.

20. A system as set forth in claim 17 wherein each of said plurality of driving signals are all of a different phase.

21. A system as set forth in claim 17 wherein said driving signal means includes a plurality of drive amplifiers.

22. A system as set forth in claim 21 wherein said drive amplifiers correspond in number to the number of different driving signals required for beam formation.

23. A system as set forth in claim 17 wherein each of said driving signals is provided to all of said switching means.

24. A system as set forth in claim 17 further comprising phase measurement means for operating the transducer elements as receiving transducers to track a target and refocusing the beam on the target during movement thereof, said phase measurement means being connected to said control means and to said transducer elements.

25. The system as set forth in claim 24 wherein said phase measurement means is coupled to the transducer elements through said switching means.

26. The system as set forth in claim 25 wherein the transducer elements being utilized as receiving transducers are coupled in parallel to said phase measurement means.

27. The system as set forth in claim 17 wherein said driving signals are low level digital phase signals and said switching means includes amplifier means for amplifying said phase signals provided to the transducer elements.

28. A system for generating and directing a focused ultrasound beam at a predetermined target, said system comprising:

an ultrasonic array, said array including a plurality of transducer elements supported relative to one another by a support structure;

a plurality of switching means for providing a driving signal to said transducer elements, said plurality of switching means corresponding in number to said transducer elements;

driving signal means for providing a plurality of driving signals, said driving signals being less in number than said transducer elements and said driving signal means being electrically connected to at least one of said switching means to provide said driving signals thereto and wherein at least one said driving signal is applied simultaneously to a plurality of the transducer elements;

control means electrically connected to said driving signal means and to said switching means, said control means for providing first control signals to said driving signal means and causing said driving signal means to provide said driving signals, said control means also for providing second control signals to said switching means and causing said switching means to connect a selected one of said driving signals to a specified one of said transducer elements; and phase measurement means for operating the transducer elements as receiving transducers to track a target and refocusing the beam on the target during movement thereof, said phase measurement means being connected to said control means and to said transducer elements, said phase measurement means coupled to the transducer elements through said switching means;

protective means for isolating said phase measurement means from said driving signals, said protective means including switches located between said phase measurement means and said switching means, said switches being closed by said control means to utilize the transducers as receiving transducers; and whereby said transducer elements cooperate so as to form an ultrasonic beam focused on a preselected target as a result of said transducer elements receiving said driving signals.

29. A system as set forth in claim 28 where said switch means are transistor switches.

30. A system for generating and directing a focused ultrasound beam at a predetermined target, said system comprising:

an ultrasonic array, said array including a plurality of transducer elements supported relative to one another by a support structure;

a plurality of switching means for providing a driving signal to said transducer elements, said plurality of switching means corresponding in number to said transducer elements;

driving signal means for providing a plurality of driving signals, said driving signals being less in number than said transducer elements and said driving signal means being electrically connected to at least one of said switching means to provide said driving signals thereto and wherein at least one said driving signal is applied simultaneously to a plurality of the transducer elements;

control means electrically connected to said driving signal means and to said switching means, said control means for providing first control signals to said driving signal means and causing said driving signal means to provide said driving signals, said control means also for providing second control signals to said switching means and causing said switching means to connect a selected one of said driving signals to a specified one of said transducer elements;

said switching means includes a phase line connect multiplexer coupled to a switch driver circuit multiplexer, said phase line connect multiplexer being coupled to said control means and connecting to a specified driving signal in response to a control signal from said control means, said switch driver circuit multiplexer being coupled to said control means and connecting to a specified transducer element in response to a control signal from said control means thereby driving the specified transducer element according to the specified driving signal; and whereby said transducer elements cooperate so as to form an ultrasonic beam focused on a preselected target as a result of said transducer elements receiving said driving signals.

31. The system as set forth in claim 30 wherein said driving signals are low level digital phase signals and said switching means includes amplifier means for amplifying said phase signals provided to he transducer elements.

32. The system as set forth in claim 31 wherein said amplifier means being coupled to said switch driver circuit means.

* * * * *